United States Patent [19]

Dinerstein

[11] Patent Number: 4,872,113
[45] Date of Patent: Oct. 3, 1989

[54] CREDIT CHECK SCANNER DATA ANALYSIS SYSTEM

[75] Inventor: Sidney F. Dinerstein, Ringwood, N.J.

[73] Assignee: JBS Associates, Inc., Ringwood, N.J.

[21] Appl. No.: 312,385

[22] Filed: Feb. 17, 1989

Related U.S. Application Data

[63] Continuation of Ser. No. 89,864, Aug. 27, 1987, abandoned.

[51] Int. Cl.$^4$ .................. G06F 13/00; G06F 15/21
[52] U.S. Cl. ........................... 364/401; 455/2; 358/84
[58] Field of Search ............ 364/401; 235/375; 358/84; 455/2

[56] References Cited

U.S. PATENT DOCUMENTS

| Re. 31,951 | 7/1985 | Johnson | 364/900 |
|---|---|---|---|
| 4,331,973 | 5/1982 | Eskin | 358/84 |
| 4,331,974 | 5/1982 | Cogswell | 358/84 |
| 4,603,232 | 7/1986 | Kurland | 358/84 |
| 4,630,108 | 12/1986 | Gomersall | 455/2 |

FOREIGN PATENT DOCUMENTS

0144085  6/1985  European Pat. Off. ............ 358/84

OTHER PUBLICATIONS

NCR Manual, "General Information", Apr. 1984, pp. 55–56.
Nielsen Marketing Research, "Nielsen Trade Services", 1987.
Nielsen Marketing Research, "The New Local Scantrack Major Market Service", pp. 1–7.
The New York Times, "The Battle to Wire the Consumer", Jul. 26, 1987.
Holly Klokis, Chain Store Age Executive, "Ukrop's Tests Data Base Marketing Program", Sep., 1987, pp. 73–75.
Roy Schwedelson, Direct Marketing, "New Wave Database", Mar. 1988, pp. 40–41 and 58.
Ukrop's Valued Customer Program, Ukrop Supermarket, Inc.

Primary Examiner—Jerry Smith
Assistant Examiner—Gail O. Hayes
Attorney, Agent, or Firm—Ostrolenk, Faber, Gerb & Soffen

[57] ABSTRACT

A system for interrelating scanner data from a supermarket checkout counter with demographic and/or economic data concerning individual customers to generate a demographic and economic analysis of sales with respect to specific supermarket items. Each customer who wishes to have check cashing privileges at the supermarket provides the supermarket with certain demographic and/or economic data and is assigned a check cashing code. Whenever that individual wishes to pay for groceries by check, the cashier at the checkout counter enters the individual's code into the cash register and the number is stored in a computer. The computer keeps track of all items purchased by the individual, preferably by the entry of item data through a bar code scanner at the checkout counter. In return for free or low cost check cashing service, the supermarket provides the accumulated item data and corresponding check cashing codes to the check cashing company, who then via computer is able to interrelate the demographic and/or economic information concerning individuals with the specific products being sold to those individuals, and provide appropriate marketing reports to manufacturers.

11 Claims, 1 Drawing Sheet

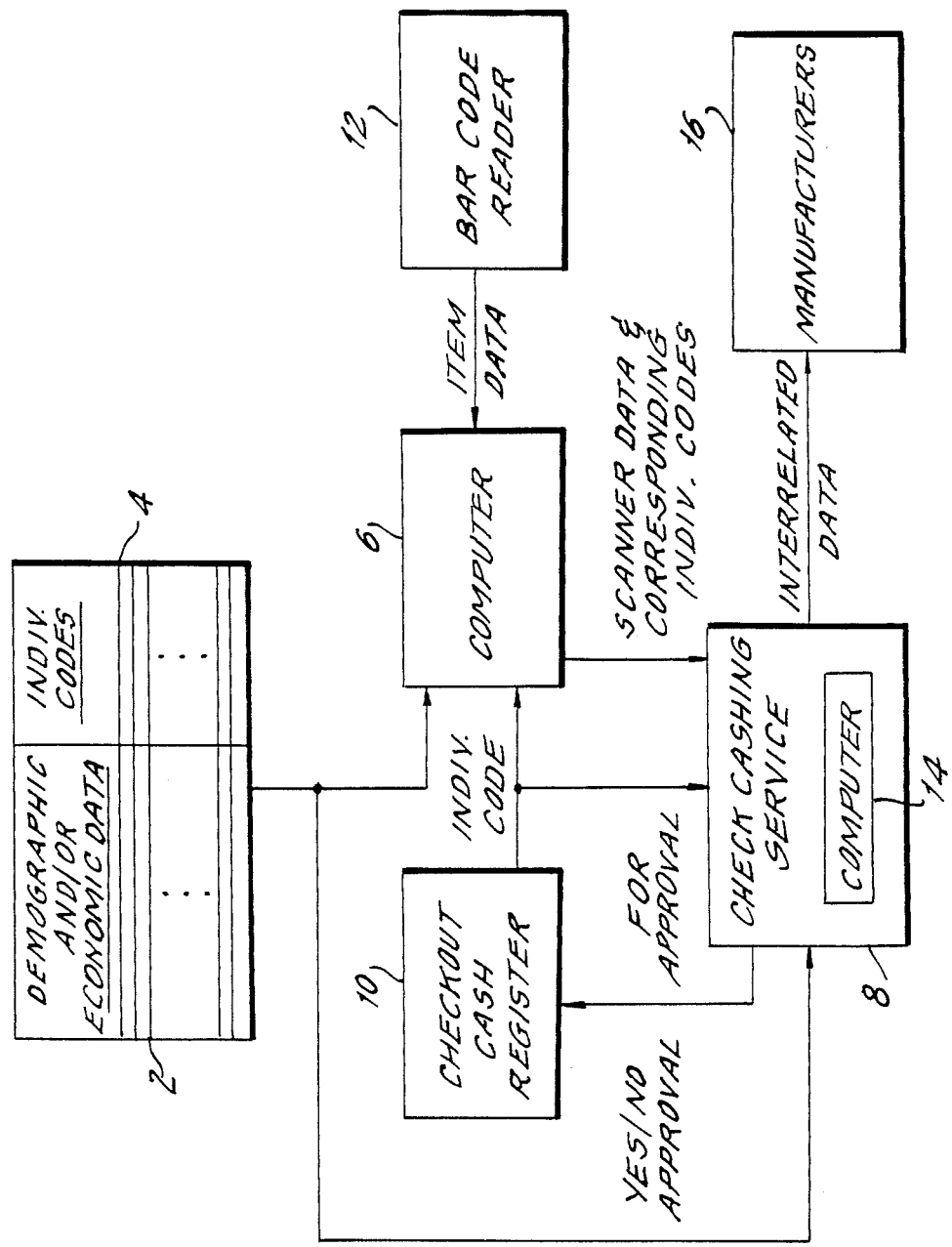

CREDIT CHECK SCANNER DATA ANALYSIS SYSTEM

This is a continuation of application Ser. No. 7/089,864 filed on Aug. 27, 1987 and now abandoned.

BACKGROUND OF THE INVENTION

The present invention relates to a data analysis system and, more specifically, to a system for generating a demographic and economic analysis of sales with respect to specific supermarket items.

Manufacturers of household consumer products spend a considerable amount of money on advertising and promotions. It is extremely important to these companies that such expenditures be cost effective and produce the desired results. For this reason, a substantial industry has developed to analyze the effectiveness of advertisements and promotions based on sales data at both the wholesale (from the manufacturer to the supermarket) and the retail (from the supermarket to the consumer) level.

It is quite common in the supermarket industry to utilize a checkout counter scanning system which scans a bar code on the supermarket products and transmits that information to both a cash register which displays the price of the product and a central computer which stores information concerning the product (e.g., price, product size, manufacturer, etc.). At least one corporation utilizes the scanner data for the purpose of providing an analysis to manufacturers of the effectiveness of sales promotions.

While the data compiled from supermarket scanners provides an analysis as to the overall effectiveness of the promotion and/or advertising campaign (i.e., whether sales and profitability have gone up or down), it does not provide a breakdown as to whether the advertising and promotions are effective for different types of consumers (i.e., men v. women, people under 30 and over 30, people with incomes under $20,000 and over $20,000, etc.). This personalized demographic and economic data is not generally available for analysis. This data is, however, stored and used by the check guarantee industry.

The check guarantee industry is in the business of guaranteeing checks based upon a database of economic information on individuals who wish to have their checks cashed in return for which the check guarantee company receives from the retailer a percentage of the amount of the check. In essence, check guarantee companies are insurance companies which insure retailers against bad checks.

When a customer presents a check to a retail establishment, the retail establishment calls the check guarantee company to determine if the check will be guaranteed by the company. The guarantee company determines whether or not the check is a worthy credit risk based on the stored demographic and economic data for that individual. If the company does guarantee the check, it charges the store a percentage of the amount of the check for the guaranteeing services.

Due to extremely low margins, supermarkets have generally been unable to avail themselves of check guarantee services. The percentage paid to the check guarantee company would cut sharply into the supermarkets' profits.

SUMMARY OF THE INVENTION

The present invention overcomes the foregoing drawbacks by interrelating the scanner data information from a supermarket checkout counter with the demographic and/or economic data concerning individual customers collected for check guaranteeing purposes.

In accordance with the invention, demographic and/or economic data for a plurality of individuals is collected and stored. A code is assigned to each individual's demographic and/or economic data.

When an individual purchases one or more items, his code is entered and stored, along with the product data identifying the items purchased by the individual. After a number of purchases have been made by a plurality of individuals, the demographic and/or economic data corresponding to the entered codes is interrelated with the entered product data to generate a demographic and/or economic analysis of sales with respect to specific items for sale.

In a preferred embodiment of the invention, a computer is used to store the demographic and/or economic data for individual customers, the code and the product data for each purchase is entered and stored in a computer, and a computer is used to interrelate the demographic and/or economic data with the product data.

In another embodiment of the invention, a first computer is located at the supermarket for storing the individual codes and product data for each purchase, and a second computer is located at a check cashing company for storing the economic and/or demographic data and corresponding codes for each individual, the second computer being used to interrelate the economic and/or demographic data with the product data received from the supermarket.

In a further embodiment of the invention, a bar code scanner at the supermarket is used to enter into the computer the product data of the items purchased.

In a still further embodiment of the invention, the code for each individual is sent to a check cashing service at the time of purchase for check approval services.

Other features and advantages of the invention are described below, with reference to the accompany drawing.

BRIEF DESCRIPTION OF THE DRAWING

The drawing is a block diagram of the system components of the present invention.

DETAILED DESCRIPTION OF THE PREFERRED EMBODIMENT

In accordance with the invention, each customer provides the supermarket with certain demographic and/or economic data 2 (e.g., his address, his income, his age, his or her sex, etc.) and is assigned a check cashing code number 4. This data entered into the supermarket's computer 6 and is also sent to the check cashing company 8 for storage. Whenever the individual wishes to have his or her check cashed at the supermarket for payment of groceries, the cashier enters the individual's check cashing code 4 into the cash register 10 at the checkout counter and the number is stored in the supermarket's computer 6. During checkout, the computer 6 keeps track of all of the items purchased by the customer and stores this data in conjunction with the entered code. The item data is preferably input into the computer 6 via a bar code scanner 12 at the checkout counter. The check cashing code is also sent electronically to the check cashing company for approval at the time of purchase.

In return for a free or low cost check cashing service, the supermarket provides the scanner data to the check cashing company, who then, via a second computer 14, is able to interrelate the demographic and/or economic information concerning individuals with the specific products being sold to those individuals and is able to provide appropriate marketing reports to various manufacturers 16 of the product sold.

Thus, by marrying the supermarket scanner data to the stored demographic and/or economic data concerning checking customers, the present invention makes it possible to provide the manufacturers with a detailed analysis as to who their customers are (i.e., by income bracket, age, gender, educational level, etc.), and which groups of customers respond favorably or unfavorably to given advertisements and/or promotions. The invention thus enables the manufacturers to much more effectively target their advertising and promotions. The present invention also makes it possible for check guarantee companies to offer their services to supermarkets at extremely low or no cost to the supermarkets, thereby opening an entirely new market to the check guarantee industry.

In the foregoing embodiment, the demographic and/or economic data is collected in connection with a check guarantee service. While this is the presently preferred embodiment of applicants' invention, the invention is not limited thereto. Supermarkets provide check cashing privileges to many of its customers without using a check guarantee service. Before offering the check cashing services to its customers, it requires the customers to complete an application form containing various demographic and/or economic data. Additionally, many supermarkets offer preferred shopper cards which customers use to accumulate discounts or credits toward future purchases. Application forms for such cards also usually require the customer to submit certain demographic and/or economic data. The demographic and/or economic data, whether collected for check cashing or other purposes, can be fully used in accordance with the present invention to create the desired marketing reports to manufacturers.

In the presently preferred embodiment, the demographic and/or income data stored for each customer preferably includes income level, gender, age and education level. More or less data can be stored as desired. The more demographic and/or economic data that is stored, the greater the flexibility in providing useful reports to manufacturers.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A process for generating a demographic and/or economic analysis of sales with respect to specific items for sale, said process comprising the steps of:
   (a) collecting and storing demographic and/or economic data for a plurality of individuals, and assigning a code to each individual corresponding to that individual's demographic and/or economic data;
   (b) entering and storing the code assigned to an individual each time that individual purchases one or more items, and entering and storing product data identifying the items purchased by the individual, said product data being stored in correlation with said code;
   (c) interrelating the demographic and/or economic data corresponding to said codes entered with said product data for purchases made by a plurality of said individuals; and
   (d) transmitting said demographic and/or economic data and product data to a check cashing service.

2. The process of claim 1, wherein said entering and storing step is carried out by data processing means each time an individual purchases items, and said data processing means is also used to carry out said interrelating the demographic and/or economic data step.

3. The process of claim 2, wherein said data processing means comprises two computers, the first computer being located at the point of sale for storing said codes and said product data for each purchase, the second computer being located at said check cashing service for interrelating said demographic and/or economic data with said product data received from said first computer.

4. The process system of claim 3, wherein said product data is entered into said first computer using a bar code scanner.

5. The process of claim 3, further comprising the step of transmitting said code to a check cashing service at the time of purchase for check approval purposes.

6. The process of claim 1, further comprising the step of sending the interrelated demographic and/or economic data and product data to at least one of the manufacturers of the products purchased by said individuals.

7. A system for generating a demographic and/or economic analysis of sales with respect to specific items for sale, said system comprising:
   (a) first means for collecting and storing demographic and/or economic data for a plurality of individuals and assigning a code to each individual corresponding to that individual's demographic and/or economic data;
   (b) second means for entering and storing the code assigned to an individual each time that individual purchases one or more items, and for entering and storing product data identifying the items purchased by the individual, said product data being stored in correlation with said code;
   (c) third means for interrelating the demographic and/or economic data corresponding to said codes entered with said product data for purchases made by a plurality of said individuals; and
   (d) fourth means for transmitting said demographic and/or economic data and product data to a check cashing service.

8. The system of claim 7, wherein said first and second means comprises a first computer located at the point of sale and said third and fourth means comprises a second computer located at said check cashing service.

9. The apparatus of claim 8, wherein said product data is entered into said first computer using a bar code scanner.

10. The system of claim 8, wherein said fourth means transmits said code to a check cashing service at the time of purchase for check approval purposes.

11. The system of claim 7, further including fifth means for sending the interrelated demographic and/or economic data and product data to at least one of the manufacturers of the products purchased by said individuals.

* * * * *